(12) United States Patent
Eto (10) Patent No.: US 8,169,189 B2
(45) Date of Patent: May 1, 2012

(54) MOBILE TERMINAL WITH A TEMPERATURE SENSOR AND METHOD OF CHARGING BATTERY MOUNTED IN MOBILE TERMINAL

(75) Inventor: Yasutaka Eto, Tokyo (JP)

(73) Assignee: NEC Corporation, Tokyo (JP)

( * ) Notice: Subject to any disclaimer, the term of this patent is extended or adjusted under 35 U.S.C. 154(b) by 621 days.

(21) Appl. No.: 11/795,445

(22) PCT Filed: Jan. 11, 2006

(86) PCT No.: PCT/JP2006/300232
§ 371 (c)(1),
(2), (4) Date: Jul. 16, 2007

(87) PCT Pub. No.: WO2006/077758
PCT Pub. Date: Jul. 27, 2006

(65) Prior Publication Data
US 2008/0136372 A1    Jun. 12, 2008

(30) Foreign Application Priority Data
Jan. 18, 2005    (JP) ................................. 2005-010834

(51) Int. Cl.
*H02J 7/00* (2006.01)
(52) U.S. Cl. .................... 320/114; 320/112; 320/150
(58) Field of Classification Search .................. 320/114, 320/150; 361/93.8
See application file for complete search history.

(56) References Cited

U.S. PATENT DOCUMENTS

| | | | | |
|---|---|---|---|---|
| 5,563,494 A * | 10/1996 | Cuesta et al. | .................. | 320/150 |
| 5,656,917 A * | 8/1997 | Theobald | ...................... | 320/106 |
| 2001/0011884 A1 * | 8/2001 | Sakakibara | .................... | 320/150 |
| 2004/0135552 A1 * | 7/2004 | Wolin et al. | .................... | 320/150 |
| 2004/0135553 A1 | 7/2004 | Sakakibara | | |
| 2005/0189913 A1 * | 9/2005 | Vitanov et al. | ................ | 320/114 |

FOREIGN PATENT DOCUMENTS

| | | |
|---|---|---|
| JP | 63-127625 | 5/1988 |
| JP | 2001-136675 | 5/2001 |
| JP | 2001-145274 | 5/2001 |
| JP | 2002-58174 | 2/2002 |
| JP | 2004-64944 | 2/2004 |
| JP | 2004-208349 | 7/2004 |
| JP | 2005-333794 | 12/2005 |
| JP | 2006-115654 | 4/2006 |

* cited by examiner

*Primary Examiner* — Arun Williams
(74) *Attorney, Agent, or Firm* — Scully, Scott, Murphy & Presser PC (57) ABSTRACT

In order to shorten a period of time necessary for charging a battery, and further, to prevent a temperature of a mobile terminal from raising, the mobile terminal 100 is comprised of a case 102 in which electronic parts are arranged, a battery 104 mounted in the case 102, a battery-charging circuit 106 supplying a current to the battery 104, a charge controller 108 allowing the battery-charging circuit 106 to charge the battery 104 or stopping the battery-charging circuit 106 from charging the battery 104, and a temperature sensor 112 detecting a temperature in the case 102, wherein the charge controller 108 controls the current to be supplied to the battery 104, in accordance with a temperature detected by the temperature sensor 112.

27 Claims, 5 Drawing Sheets

MOBILE TERMINAL WITH A TEMPERATURE SENSOR AND METHOD OF CHARGING BATTERY MOUNTED IN MOBILE TERMINAL

BACKGROUND OF THE INVENTION

1. Field of the Invention

The invention relates to a mobile terminal, and more particularly to a method of charging a battery mounted in a mobile terminal 2. Description of the Related Art A mobile terminal such as a mobile phone, PHS (Personal Handy-phone System), PDA (Personal Data Assistance or Personal Digital Assistant) and a note-type personal computer has been designed to include a battery in a case thereof for supplying electric power to electronic parts constituting a mobile terminal. A battery is designed to be able to be electrically connected to an external AC power source, and to be charged when electrically connected to the AC power source.

A system for charging a battery is suggested, for instance, in Japanese Patent Application Publications Nos. 2002-58174 and 2001-136675 (patent references 1 and 2).

In the system suggested in patent reference 1, a temperature around a capacitor is detected, and a voltage of a battery observed when fully charged is varied in accordance with the detected temperature. When a voltage of a battery is over the voltage of a battery observed when the battery is fully charged, the battery is stopped from being charged.

In the system suggested in patent reference 2, a temperature of a battery is detected. A target temperature to which a temperature of a battery is aimed to reach is varied in accordance with the detected temperature, and a current for charging a battery is varied in accordance with the target temperature. If a temperature of a battery exceeds a target temperature, a battery is stopped from being charged.

Patent reference 1: Japanese Patent Application Publication No. 2002-58174

Patent reference 2: Japanese Patent Application Publication No. 2001-136675

In a mobile terminal, a charging circuit produces calorific power when it charges a battery, and some electronic parts such as CPU and a signal transmitter/receiver also produce calorific power.

In the systems suggested in the above-mentioned patent references 1 and 2, since a current for charging a battery is varied in accordance with a temperature of a battery, if the systems suggested in the above-mentioned patent references 1 and 2 were applied to a mobile terminal, it would not be possible to control a temperature of a mobile terminal, taking into consideration calorific power produced by electronic parts other than a charging circuit.

Hence, if electronic parts other than a charging circuit, and a battery simultaneously produce calorific power, a temperature of a mobile terminal excessively rises, resulting in that a surface temperature of a case also rises, and a user of a mobile terminal feels ill when he/she makes direct touch with a surface of a case. In order to solve this problem, if a target voltage of a battery and a target temperature of a battery are set low, a current for charging a battery is reduced even when electronic parts other than a charging circuit do not produce calorific power, resulting in another problem that it takes too much time to charge a battery.

SUMMARY OF THE INVENTION

In view of the above-mentioned problems which occur when a conventional mobile terminal is charged, it is an object of the present invention to provide a mobile terminal, a method of charging a battery mounted in a mobile terminal, and a program for executing the method, all of which are capable of shortening a period of time necessary for charging a battery, and preventing a temperature of a mobile terminal from rising.

In order to achieve the above-mentioned object, the present invention provides a mobile terminal including a case in which electronic parts are arranged, a battery mounted in the case, a battery-charging circuit supplying a current to the battery, a charge controller allowing the battery-charging circuit to charge the battery or stopping the battery-charging circuit from charging the battery, and a temperature sensor detecting a temperature in the case, the charge controller controlling the current to be supplied to the battery, in accordance with a temperature detected by the temperature sensor.

In the mobile terminal in accordance with the present invention, since a temperature in the case is detected by the temperature sensor, it is possible to detect a temperature of an entirety of a mobile terminal taking into consideration calorific power produced by electronic parts other than the charging circuit. Furthermore, since the charge controller controls a current to be supplied to the battery, in accordance with a temperature in the case, a current to be supplied to the battery is controlled within a range of a temperature allowable for a mobile terminal. Thus, when electronic parts produce calorific power in a relatively great amount, it would be possible to reduce a current to be supplied to the battery to thereby prevent a temperature of an entirety of a mobile terminal from rising. When electronic parts produce calorific power in a relatively small amount, it would be possible to increase a current to be supplied to the battery to thereby shorten a period of time necessary for charging the battery.

The charge controller may be designed to select a first current as the current when a temperature detected by the temperature sensor is higher than a predetermined switch-temperature, and select a second current greater than the first current, as the current when a temperature detected by the switch-temperature sensor is lower than the predetermined switch-temperature.

When a temperature in the case detected by the temperature sensor is higher than a predetermined switch-temperature, it means that electronic parts arranged in the case produce calorific power in a great amount. Hence, the charge controller selects a first current which is relatively small, as a current to be supplied to a battery, to thereby reduce calorific power produced by a battery, and accordingly, prevent a temperature of an entirety of a mobile terminal from rising. In contrast, when a temperature in the case detected by the temperature sensor is lower than the predetermined switch-temperature, it means that electronic parts arranged in the case produce calorific power in a small amount. Hence, the charge controller selects a second current which is relatively great, as a current to be supplied to a battery, to thereby rapidly charge a battery for shortening a period of time necessary for charging a battery.

The first current and the second current may be variable in dependence on operational condition of the mobile terminal.

The first current and the second current may be fixed, or may be variable. By setting the first and second currents to be variable, it would be possible to vary a weight in preventing a temperature of an entirety of a mobile terminal from rising, and shortening a period of time necessary for charging a battery, in accordance with a condition in which a mobile terminal is used and/or an environment in which a mobile terminal is used.

The charge controller may be designed to select a first current as the current when a differential of a temperature detected by the temperature sensor is zero or positive, and select a second current greater than the first current, as the current when a differential of a temperature detected by the temperature sensor is negative.

If a differential of a temperature detected by the temperature sensor is positive, a temperature in the case is likely to increase, and if a differential of a temperature detected by the temperature sensor is negative, a temperature in the case is likely to lower. Hence, by using a differential of a temperature detected by the temperature sensor in place of a temperature in the case detected by the temperature sensor, it would be possible to control a temperature in the case of a mobile terminal.

The charge controller may be designed to stop the battery from being charged when a temperature detected by the temperature sensor is higher than a predetermined stop-temperature, and allow the battery to be charged when a temperature detected by the temperature sensor is lower than the predetermined stop-temperature.

A stop-temperature is determined lower than the above-mentioned switch-temperature, for instance. When a temperature in the case detected by the temperature sensor is higher than a predetermined stop-temperature, it means that electronic parts arranged in the case produce calorific power in a great amount. Hence, the charge controller stops charging the battery to thereby prevent the battery from producing calorific power, and accordingly, prevent a temperature of an entirety of a mobile terminal from rising. In contrast, when a temperature in the case detected by the temperature sensor is lower than the predetermined stop-temperature, it means that electronic parts arranged in the case produce calorific power in a small amount. Accordingly, the charge controller carries out charging the battery.

It is preferable that the temperature sensor is disposed between an electronic part producing calorific power in a greatest amount among the electronic parts, and an electronic part producing calorific power in a second greatest power among the electronic parts.

This arrangement makes it possible to accurately detect a temperature in the case.

The mobile terminal is comprised of a mobile phone, for instance.

It is preferable that a plurality of the switch-temperatures is determined in advance, and a plurality of currents is determined in advance in association with the switch-temperatures, wherein the charge controller selects one of the currents in dependence on whether a temperature detected by the temperature sensor is higher or lower than an associated switch-temperature.

The present invention further provides a method of charging a battery mounted in a mobile terminal including a case in which electronic parts are arranged, a battery mounted in the case, and a battery-charging circuit supplying a current to the battery, the method including a first step of detecting a temperature in the case, and a second step of controlling a current to be supplied to the battery from the battery-charging circuit, in accordance with a temperature detected in the first step.

It is preferable that, in the second step, a first current is selected as the current when the temperature is higher than a predetermined switch-temperature, and a second current greater than the first current is selected as the current when the temperature is lower than the predetermined switch-temperature.

The method in accordance with the present invention may further include varying the first current and the second current in dependence on operational condition of the mobile terminal.

It is preferable that, in the second step, a first current is selected as the current when a differential of the temperature is zero or positive, and a second current greater than the first current is selected as the current when a differential of the temperature is negative.

It is preferable that, in the second step, the battery is stopped from being charged when the temperature is higher than a predetermined stop-temperature, and the battery is allowed to be charged when the temperature is lower than the predetermined stop-temperature.

It is preferable that a plurality of the switch-temperatures is determined in advance, and a plurality of currents is determined in advance in association with the switch-temperatures, wherein one of the currents is selected in dependence on whether the detected temperature is higher or lower than an associated switch-temperature in the second step.

The present invention further provides, in a method of charging a battery mounted in a mobile terminal including a case in which electronic parts are arranged, a battery mounted in the case, a battery-charging circuit supplying a current to the battery, and a charge controller allowing the battery-charging circuit to charge the battery or stopping the battery-charging circuit from charging the battery, a program for causing the charge controller to carry out the method of charging a battery mounted in a mobile terminal, steps executed by the charge controller in accordance with the program including a first step of controlling a current to be supplied to the battery from the battery-charging circuit, in accordance with a temperature detected in the case.

It is preferable that, in the first step, a first current is selected as the current when the temperature is higher than a predetermined switch-temperature, and a second current greater than the first current is selected as the current when the temperature is lower than the predetermined switch-temperature.

The first current and the second current may be varied in dependence on operational condition of the mobile terminal.

It is preferable that, in the first step, a first current is selected as the current when a differential of the temperature is zero or positive, and a second current greater than the first current is selected as the current when a differential of the temperature is negative.

It is preferable that, wherein, in the first step, the battery is stopped from being charged when the temperature is higher than a predetermined stop-temperature, and the battery is allowed to be charged when the temperature is lower than the predetermined stop-temperature.

It is preferable that a plurality of the switch-temperatures is determined in advance, and a plurality of currents is determined in advance in association with the switch-temperatures, wherein one of the currents is selected in dependence on whether the detected temperature is higher or lower than an associated switch-temperature in the first step.

The above and other objects and advantageous features of the present invention will be made apparent from the following description made with reference to the accompanying drawings, in which like reference characters designate the same or similar parts throughout the drawings.

DESCRIPTION OF THE EXEMPLARY EMBODIMENTS

Preferred exemplary embodiments in accordance with the present invention will be explained hereinbelow with reference to drawings.

The mobile terminal in accordance with the present invention is applied to a mobile phone in exemplary embodiments explained hereinbelow. In explanation made with reference to drawings, the same parts have been provided with the same reference numerals, and will not be explained in duplicate.

Figure 1:
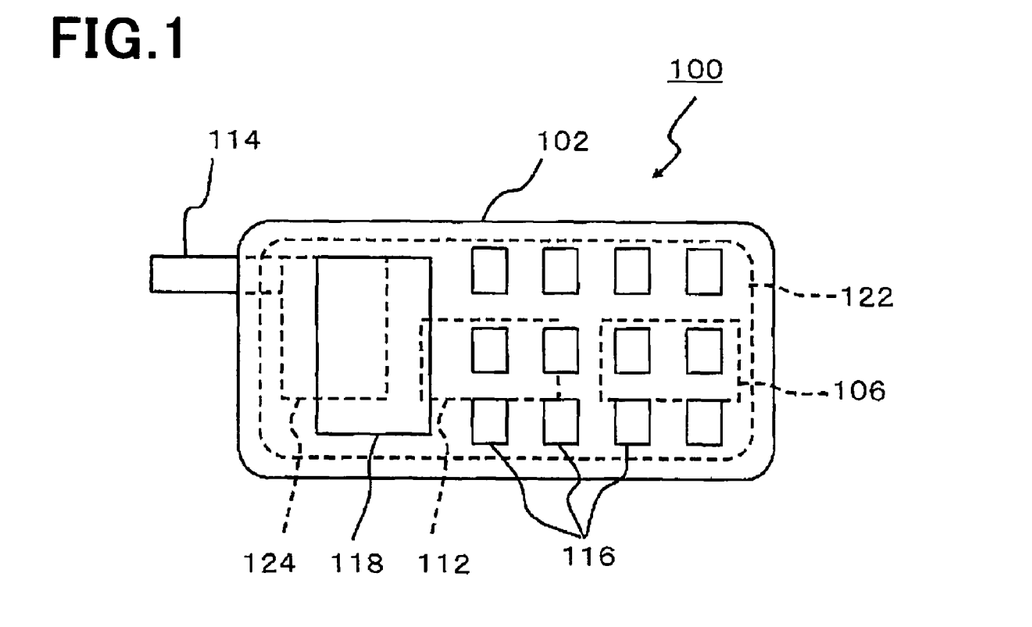
FIG. 1 is a plan view of a mobile phone as a mobile terminal in accordance with the first exemplary embodiment of the present invention.
Figure 2:
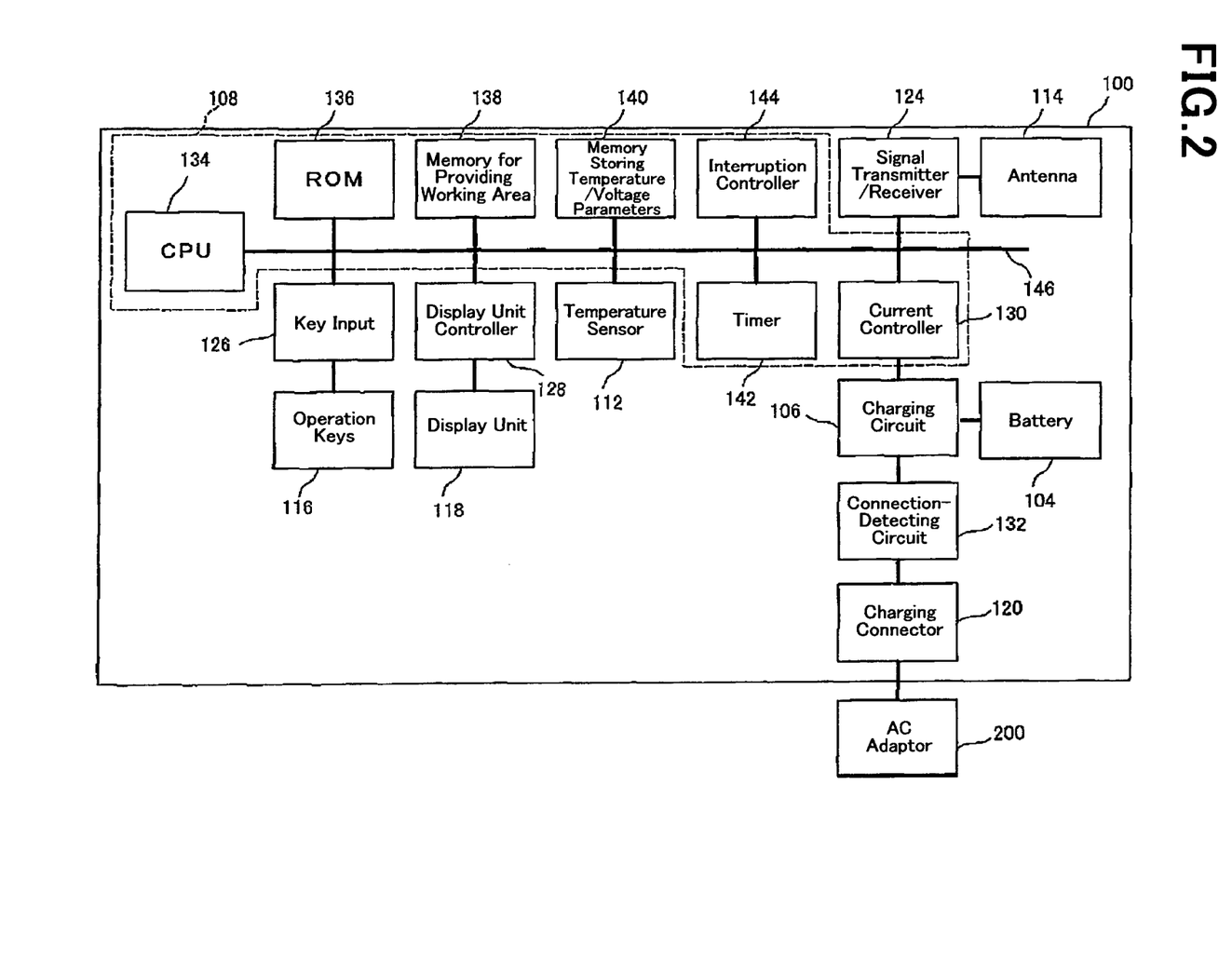
FIG. 2 is a block diagram of the mobile phone illustrated in FIG. 1.

FIG. 1 is a plan view of a mobile phone 100 as a mobile terminal in accordance with the first exemplary embodiment of the present invention, and FIG. 2 is a block diagram of the mobile phone 100.

As illustrated in FIGS. 1 and 2, the mobile phone 100 is comprised of a case 102 in which electronic parts defining the mobile phone 100 are arranged, a battery 104 mounted in the case 102, a charging circuit 106 supplying a current derived from electric power supplied from an AC adaptor 200 electrically connected to a later mentioned charging connector 120, to the battery 104, a charge controller 108 causing the charging circuit 106 to charge the battery 104 and stop the charging circuit 106 from charging the battery 104, a temperature sensor 112 detecting a temperature in the case 102, a display unit 118 comprised of a liquid crystal display device, a display unit controller 128 controlling an operation of the display unit 118 (what is displayed in the display unit 118), a plurality of operation keys 116, a key input 126 acting as an interface for electrically connecting the operation keys 116 to the charge controller 108, a retractable antenna 114, a signal transmitter/receiver 124 for transmitting and receiving signals through the antenna 114, a charging connector 120 connectable to the AC adaptor 200 through which power is supplied to the mobile phone 100 from an external AC power source, and a connection-detecting circuit 132 which monitors whether the charging connector 120 and the AC adaptor 200 are electrically connected to each other.

The case 102 is in the form of a flat box extending in a certain direction. The antenna 114 is attached to the case 102 at an end of the case 102.

The operation keys 116 and the display unit 118 are arranged on a surface of the case 102. A user can input commands into the mobile phone 100 through the operation keys 116. The display unit 118 displays data input by a user through the operation keys 116, and data necessary for a user such as data received from other mobile terminals. For instance, the display unit 118 may be comprised of an organic EL (electronic fluorescence) device.

The battery 104 is mounted in the case 102 at the other end of the case 102. The battery 104 can be taken out of the case 102 through a rear surface of the case 102.

The charging connector 120 is arranged in the case 102 at the other end of the case 102, and is connectable to the AC adaptor 200.

As illustrated in FIG. 1, a multi-layered printing wiring board 122 is arranged in the case 102.

On the multi-layered printing wiring board 122 are arranged the charge controller 108, the temperature sensor 112, the signal transmitter/receiver 124, the key input 126, the display unit controller 128, the charging circuit 106, and the connection-detecting circuit 132.

The signal transmitter/receiver 124 is electrically connected to a distal end of the antenna 114, and is comprised of a circuit for transmitting and receiving data in radio communication.

The charging circuit 106 is electrically connected to a current controller 130, and controls a current to be supplied to the battery 104, in accordance with a command transmitted from the current controller 130.

The connection-detecting circuit 132 is disposed between the charging circuit 106 and the charging connector 120, and monitors whether the charging connector 120 is connected to the AC adaptor 200.

The charge controller 108 is comprised of CPU 134, ROM 136, a memory 138 for providing a working area, a memory 140 storing parameters about a temperature and a voltage, a timer 142, an interruption controller 144, and a current controller 130.

CPU 134, ROM 136, the memory 138, the memory 140, the timer 142, the interruption controller 144, and the current controller 130 are electrically connected to one another through a bus 146. Furthermore, the charge controller 108 is electrically connected to the signal transmitter/receiver 124, the temperature sensor 112, the key input 126, the display unit controller 128 and the charging circuit 106 through the bus 146.

The charge controller 108 controls a current to be supplied to the battery 104, in accordance with a temperature in the case 102 detected by the temperature sensor 112.

Figure 3:
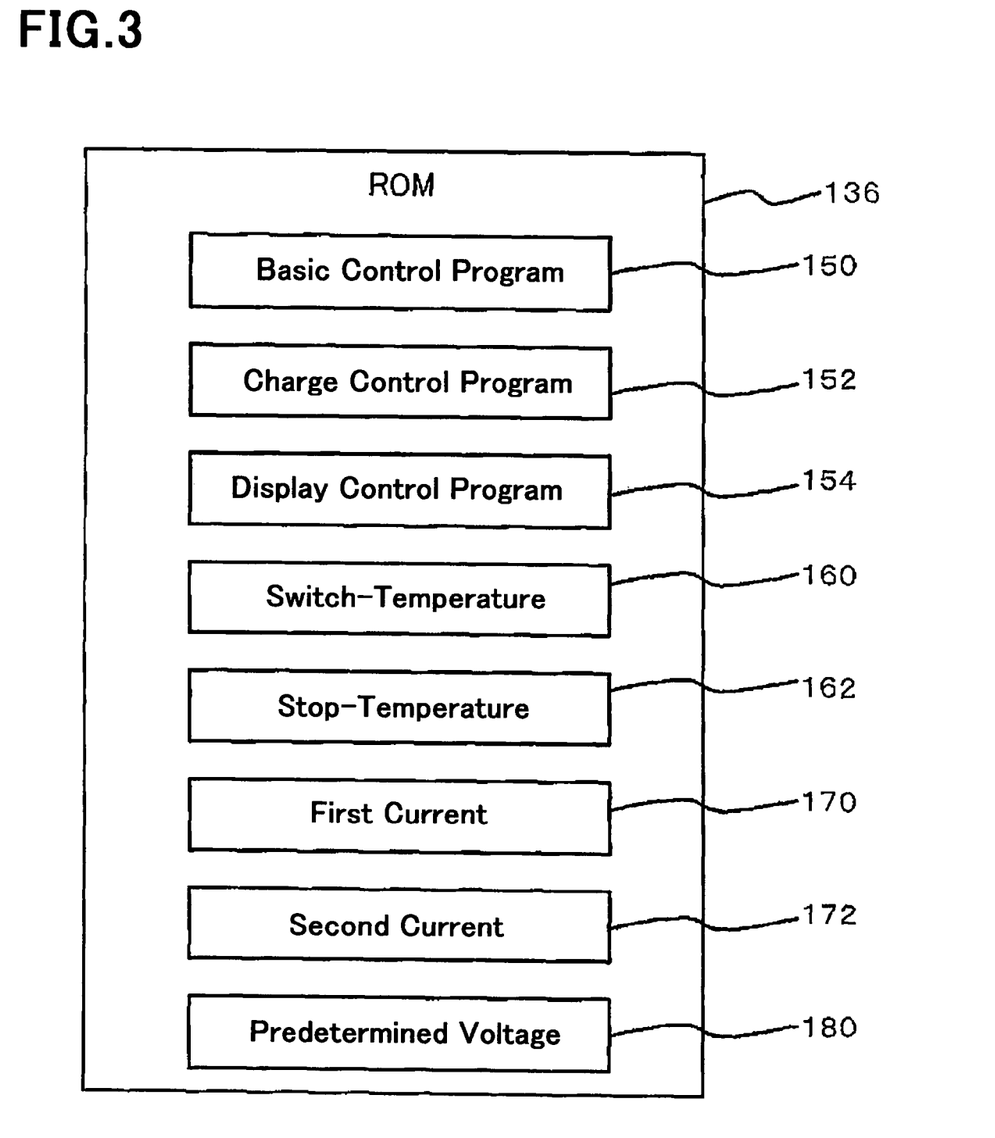
FIG. 3 is a block diagram showing what is stored in ROM in the mobile phone illustrated in FIG. 1.

FIG. 3 is a block diagram of ROM 136.

As illustrated in FIG. 3, ROM 136 stores therein a basic control program 150 for controlling operation of the parts defining the mobile phone 100, a charge control program 152 for controlling charging the battery 104, a display control program 154 for displaying how much degree the battery 104 is charged, in the display unit 118, a switch-temperature 160, a stop-temperature 162, a first current 170, a second current 172, and a predetermined voltage 180.

The charge control program 152 operates CPU 134 in accordance with a temperature detected by the temperature sensor 112 to switch a current between the first and second currents, and stop charging the battery 104.

The display control program 154 operates CPU 134 such that a voltage of the battery 104 and a current supplied to the battery 104 while the battery 104 is being charged are displayed in the display unit 118.

The switch-temperature 160 is used for switching a current to be supplied to the battery 104, and the stop-temperature 162 is used for stopping charging the battery 104. The stop-temperature 162 is determined lower than the switch-temperature 160.

In the mobile phone 100 in accordance with the first exemplary embodiment, a current for charging the battery 104 is switched between two currents. The first current 170 and the second current 172 both stored in ROM 136 are used for switching a current. The second current 172 is determined higher than the first current 170.

Specifically, the charge controller 108 equalizes a current to be supplied to the battery 104 to the first current 170 when a temperature detected by the temperature sensor 112 is higher than the predetermined switch-temperature 160, and equalizes a current to be supplied to the battery 104 to the second current 172 when a temperature detected by the temperature sensor 112 is lower than the predetermined switch-temperature 160.

Furthermore, the charge controller 108 allows the battery 104 to be charged, if a temperature detected by the temperature sensor 112 is higher than the predetermined stop-temperature 162, and stops charging the battery 104, if a temperature detected by the temperature sensor 112 is lower than the predetermined stop-temperature 162.

The predetermined voltage 180 indicates a voltage of the battery 104 when fully charged.

CPU 134 executes the basic control program 150, the charge control program 152, and the display control program 154 all stored in ROM 136 to thereby control operation of the parts electrically connected to one another through the bus 146. Specifically, CPU 134 reads the programs 150, 152 and 154 out of ROM 136 and executes the programs 150, 152 and 154 in accordance with a predetermined process sequence, to thereby control operation of the parts defining the mobile phone 100, and further, control charging the battery 104.

Each of the memory 138 and the memory 140 is comprised of RAM. The memory 138 stores a program(s) and/or data temporarily necessary for CPU 134 to execute the programs 150, 152 and 154.

Figure 4:
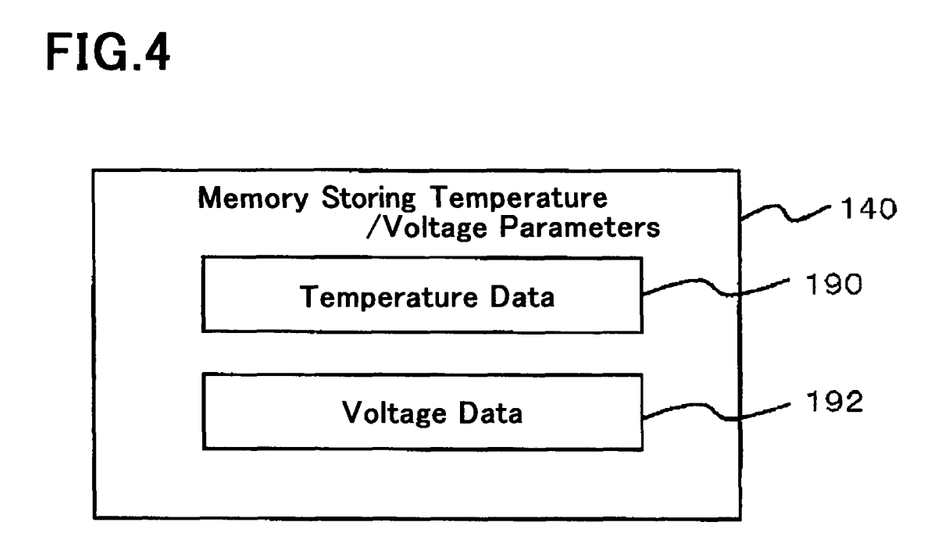
FIG. 4 is a block diagram showing what is stored in the memory storing temperature/voltage parameters therein in the mobile phone illustrated in FIG. 1.

FIG. 4 is a block diagram showing what is stored in the memory 140.

As illustrated in FIG. 4, the memory 140 stores temperature data 190, indicative of a temperature in the case 102, to be used when CPU 134 makes decision as to switching a current to be supplied to the battery 104, and stopping charging the battery 104, and voltage data 192 indicative of a present voltage of the battery 104. In the first exemplary embodiment, the temperature data 190 and the voltage data 192 are successively updated.

The interruption controller 144 is comprised of a circuit which, when the connection-detecting circuit 132 detects connection of the charging connector 120 to the AC adaptor 200, produces an interruption routine to CPU 134 to execute the charge control program 152.

Figure 5:
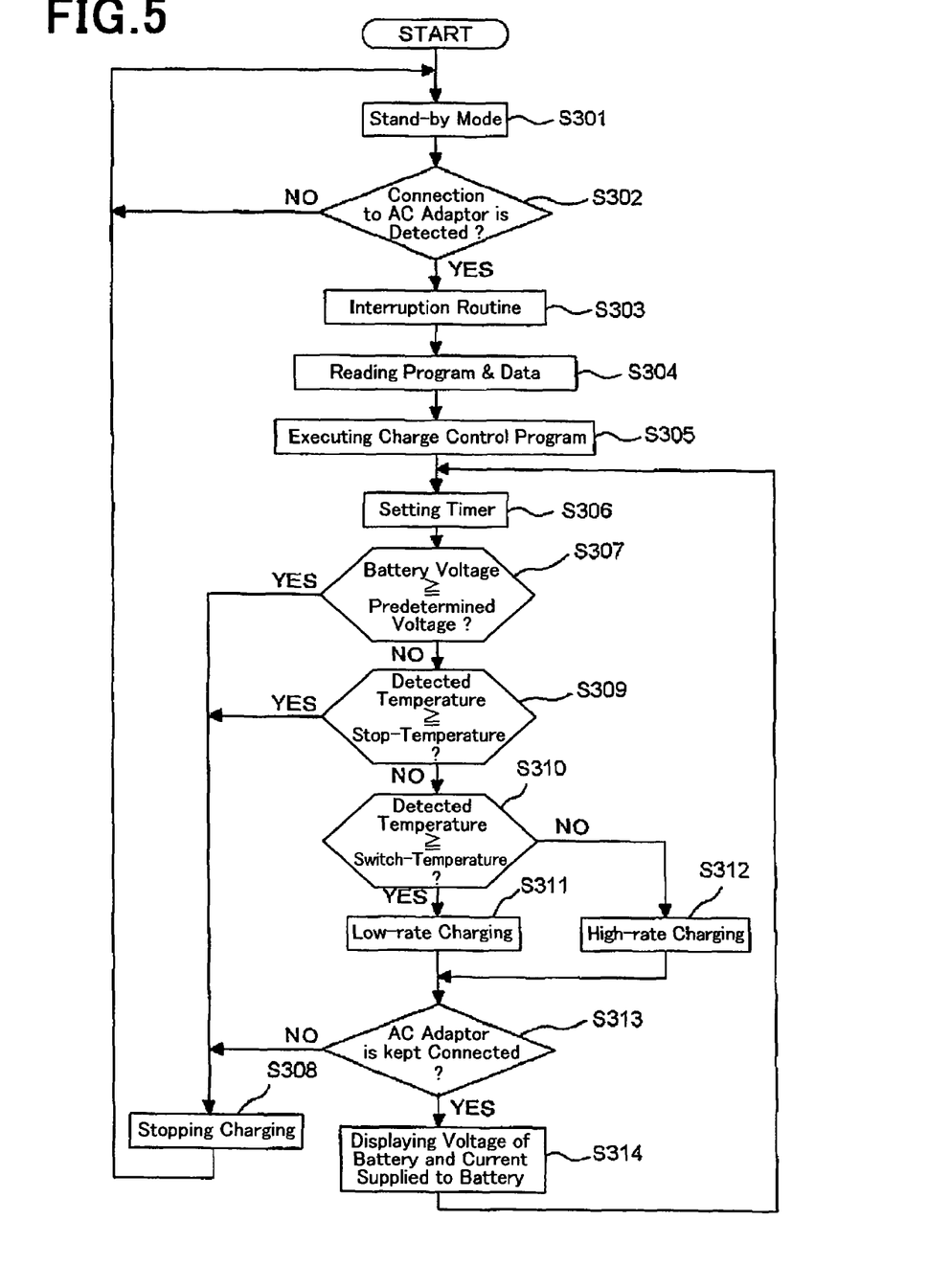
FIG. 5 is a flow-chart showing steps to be carried out when a battery is charged in the mobile phone illustrated in FIGS. 1 and 2.

FIG. 5 is a flow-chart showing steps to be carried out when the battery 104 mounted in the mobile phone 100 is charged.

Hereinbelow are explained steps to be carried out when the battery 104 mounted in the mobile phone 100 is charged, with reference to FIG. 5.

The mobile phone 100 is generally in a stand-by mode (step S301).

While the mobile phone 100 is in a stand-by mode, the connection-detecting circuit 132 always monitors whether the charging connector 120 is connected to the AC adaptor 200 (step S302).

When the connection-detecting circuit 132 does not detect connection of the charging connector 120 to the AC adaptor 200 (NO in step S302), the connection-detecting circuit 132 keeps monitoring until connection of the charging connector 120 to the AC adaptor 200 is detected.

If the connection-detecting circuit 132 detects connection of the charging connector 120 to the AC adaptor 200 (YES in step S302), the connection-detecting circuit 132 transmits a signal indicative of the connection of the charging connector 120 to the AC adaptor 200, to the interruption controller 144. On receipt of the signal, the interruption controller 144 transmits an interruption routine to CPU (step S303).

On receipt of the interruption routine, CPU 134 reads the charge control program 152 out of ROM 136, and further, reads the temperature data 190 and the voltage data 192 out of the memory 140 (step S304).

CPU 134 stores the charge control program 152, the temperature data 190 and the voltage data 192 into the memory 138, and starts the charge control program 152 up (step S305). As a result, the mobile phone 100 is transferred into a charge-controlled mode.

Then, CPU 134 determines a period of time (for instance, 5 minutes) at which CPU 134 judges whether a current to be supplied to the battery 104 should be switched, and whether the battery 104 should be stopped from being charged during the charge control program 152 is being executed. CPU 134 sets the determined period of time in the timer 142 (step S306). In the first exemplary embodiment, a period of time set in the timer 142 is a constant. CPU 134 judges every the determined period of time whether a current to be supplied to the battery 104 should be switched, and whether the battery 104 should be stopped from being charged Then, CPU 134 judges whether a present voltage of the battery 104 is equal to or higher than the predetermined voltage 180 in accordance with the charge control program 152 (step S307).

If a present voltage of the battery 104 is equal to or higher than the predetermined voltage 180 (YES in step S307), CPU 134 judges that the battery 104 is completely charged, or it is not necessary to charge the battery 104, and accordingly, CPU 134 stops charging the battery 104 (step S308).

Then, the mobile phone 100 is transferred again into a stand-by mode (step S301).

If a present voltage of the battery 104 is lower than the predetermined voltage 180 (NO in step S307), CPU 134 further judges whether a temperature detected by the temperature sensor 112 is equal to or higher than the stop-temperature 162 (step S309).

If a temperature detected by the temperature sensor 112 is equal to or higher than the stop-temperature 162 (YES in step S309), CPU 134 stops charging the battery 104 (step S308).

Then, the mobile phone 100 is transferred again into a stand-by mode (step S301).

If a temperature detected by the temperature sensor 112 is lower than the stop-temperature 162 (NO in step S309), CPU 134 judges whether a temperature detected by the temperature sensor 112 is equal to or higher than the switch-temperature 160 (step S310).

If a temperature detected by the temperature sensor 112 is equal to or higher than the switch-temperature 160 (YES in step S310), CPU 134 operates the current controller 130 to cause a current to be supplied to the battery 104 to be equal to the first current 170, to thereby charge the battery 104 at a relatively low rate (step S311).

If a temperature detected by the temperature sensor 112 is smaller than the switch-temperature 160 (NO in step S310), CPU 134 operates the current controller 130 to cause a current to be supplied to the battery 104 to be equal to the second current 172, to thereby charge the battery 104 at a relatively high rate (step S312).

After the battery 104 has been started to be charged, the connection-detecting circuit 132 judges whether the charging connector 120 and the AC adaptor 200 are kept connected to each other (step S313).

If the charging connector 120 and the AC adaptor 200 are not kept connected to each other (NO in step S313), CPU 134 stops charging the battery 104 (step S308).

Then, the mobile phone 100 is transferred again into a stand-by mode (step S301).

If the charging connector 120 and the AC adaptor 200 are kept connected to each other (YES in step S313), CPU 134 displays a voltage of the battery 104 and a current supplied to the battery 104 in the display unit 118 (step S314).

After a period of time set in the timer 142 has passed, steps S306 to S314 are repeatedly carried out, until charging the battery 104 is stopped (step S308).

As mentioned above, since a temperature in the case 102 is detected by the temperature sensor 112 in the mobile phone 100 as a mobile terminal in accordance with the first exemplary embodiment, it is possible to detect a temperature of an entirety of the mobile terminal taking into consideration calorific power produced by electronic parts other than the charging circuit 106.

In the first exemplary embodiment, as illustrated in FIG. 1, since the temperature sensor 112 is disposed between the signal transmitter/receiver 124 and the charging circuit 106 both producing calorific power in a relatively great amount, it is possible to accurately detect a temperature in the case 102. Furthermore, since the charge controller 108 controls a current to be supplied to the battery 104, in accordance with a temperature in the case 102, a current to be supplied to the battery 104 is controlled within a range of a temperature allowable for an entirety of the mobile terminal.

Thus, when electronic parts produce calorific power in a relatively great amount, it would be possible to reduce a current to be supplied to the battery 104 to thereby prevent a temperature of an entirety of the mobile terminal from rising. When electronic parts produce calorific power in a relatively small amount, it would be possible to increase a current to be supplied to the battery 104 to thereby shorten a period of time necessary for charging the battery 104. Accordingly, it is possible to shorten a period of time necessary for charging the battery 104, and prevent a temperature of an entirety of the mobile terminal from rising.

Furthermore, since a current to be supplied to the battery 104 is switched between the first and second currents in the mobile phone 100 as a mobile terminal in accordance with the first exemplary embodiment, it is possible to optimally control a current to be supplied to the battery 104.

In addition, since a current to be supplied to the battery 104 is switched among a plurality of currents, a current supplied to the battery 104 can be readily displayed in the display unit 118. Accordingly, when the mobile phone 100 is used while the battery 104 is being charged, it is possible to let a user know that a current supplied to the battery 104 is changed into a smaller current, and hence, it takes much time more than usually to fully charge the battery 104. That is, it is possible to avoid a user from misunderstanding that it takes much time to charge the battery 104 due to defectiveness of the mobile phone 100.

In the first exemplary embodiment, since a current to be supplied to the battery 104 is switched to another in dependence on whether a temperature detected by the temperature sensor 112 is higher than the switch-temperature, it would be possible to change specification of the mobile phone 100 and match the mobile phone 100 to an area in which the mobile phone 100 is to be sold, by changing the switch-temperature 160. This ensures that the mobile phones 100 each having specification different from others or to be sold in areas different from one another may be designed to have common parts.

In addition, since the battery 104 is charged or stopped from being charged in dependence on a temperature in the case 102 in the mobile phone 100 as a mobile terminal in accordance with the first exemplary embodiment, it would be possible to readily control charging the battery 104. In particular, in the first exemplary embodiment, since the battery 104 is charged or stopped from being charged in dependence on whether a temperature detected by the temperature sensor 112 is higher than the stop-temperature 162, it would be possible to change specification of the mobile phone 100 and match the mobile phone 100 to an area in which the mobile phone 100 is to be sold, by changing the stop-temperature 162. This ensures that the mobile phones 100 each having specification different from others or to be sold in areas different from one another may be designed to have common parts.

Though the mobile terminal in accordance with the first exemplary embodiment is applied to the mobile phone 100, it should be noted that the mobile terminal in accordance with the first exemplary embodiment may be applied to PHS, PDA or a note-type personal computer.

Furthermore, through the mobile phone 100 in the first exemplary embodiment is designed to include a single case 102, the mobile phone 100 may be designed to include two cases foldably connected to each other through a hinge.

In the first exemplary embodiment, a current to be supplied to the battery 104 is switched among two currents in dependence on whether a temperature detected by the temperature sensor 112 is higher than the switch-temperature 160. However, it should be noted that two or more switch-temperatures 160 may be determined in advance, in which case, a current to be supplied to the battery 104 can be switched among three currents. This ensures that a period of time necessary for charging the battery 104 can be further shortened.

In the first exemplary embodiment, the first current 170 and the second current 172 both stored in ROM 136 are constant. However, the first current 170 and the second current 172 may be designed to be variable. For instance, the first current 170 and the second current 172 may be designed to be variable in accordance with an operational condition of the mobile phone 100, by storing a table indicating the first current 170 and the second current 172 in ROM 136.

In the first exemplary embodiment, a temperature detected by the temperature sensor 112 is used as it is to switch a current to be supplied to the battery 104 in dependence on whether the temperature is higher than the switch-temperature 160. In place of using a temperature detected by the temperature sensor 112 as it is, it is possible to use a differential of a temperature detected by the temperature sensor 112 to thereby switch a current to be supplied to the battery 104.

If a differential of a temperature detected by the temperature sensor 112 is zero, a temperature detected by the temperature sensor 112 is constant. If a differential of a temperature detected by the temperature sensor 112 is positive, a temperature detected by the temperature sensor 112 is likely to increase. Thus, if a differential of a temperature detected by the temperature sensor 112 is zero or positive, CPU 134 equalizes a current to be supplied to the battery 104, to the first current 170 through the current controller 130 to thereby charge the battery 104 at a low rate (step S311 in FIG. 5), similarly to the case in which a temperature detected by the temperature sensor 112 is equal to or higher than the switch-temperature 160 (YES in step S311).

If a differential of a temperature detected by the temperature sensor 112 is negative, a temperature detected by the temperature sensor 112 is likely to lower. Thus, if a differential of a temperature detected by the temperature sensor 112 is negative, CPU 134 equalizes a current to be supplied to the battery 104, to the second current 172 through the current controller 130 to thereby charge the battery 104 at a high rate (step S312 in FIG. 5), similarly to the case in which a temperature detected by the temperature sensor 112 is lower than the switch-temperature 160 (NO in step S311). Even if a differential of a temperature detected by the temperature sensor 112 is zero, a current to be supplied to the battery 104 may be set equal to the second current 172.

In the mobile phone 100 as a mobile terminal in accordance with the first exemplary embodiment, as illustrated in FIG. 1, the temperature sensor 112 is disposed between the signal transmitter/receiver 124 and the charging circuit 160. It should be noted that the temperature sensor 112 may be disposed in dependence on arrangement of electronic parts mounted in the case 102.

For instance, if a certain electronic part other than the signal transmitter/receiver 124 produces much calorific power in the case 102, a position of the temperature sensor 112 may be determined in accordance with the certain electronic part. For instance, the temperature sensor 112 may be disposed adjacent to the certain electronic part.

If a particular portion of the case 102 such as a portion of an outer surface of the case 102 at which a user makes contact with the mobile phone 100 produces much calorific power, the temperature sensor 112 may be disposed close to the particular portion.

In the first exemplary embodiment, the battery 104 is designed to be detachable from the case 102. In contrast, the battery 104 may be designed to be fixed in the case 102.

The exemplary advantages obtained by the above-mentioned exemplary embodiments are described hereinbelow.

The mobile terminal, a method of charging a battery mounted in a mobile terminal, and a program for executing the method all in accordance with the above-mentioned exemplary embodiments make it possible to shorten a period of time necessary for charging a battery, and prevent a temperature of an entirety of a mobile terminal from rising.

What is claimed is:

1. A mobile terminal comprising:
   a case;
   a battery mounted in said case;
   electronic parts arranged in said case, and operating with electric power supplied from said battery;
   a circuit board having the electronic parts mounted thereon, said battery not being mounted on the circuit board;
   a battery-charging circuit supplying a current to said battery;
   a charge controller allowing said battery-charging circuit to charge said battery or stopping said battery-charging circuit from charging said battery; and
   a temperature sensor detecting a temperature in said case, the temperature sensor disposed between an electronic part generating a largest amount of heat and another electronic part generating a second largest amount of heat among said electronic parts, said temperature sensor being mounted on the circuit board,
   said charge controller controlling said current to be supplied to said battery, in accordance with a temperature detected by said temperature sensor.

2. The mobile terminal as set forth in claim 1, wherein said charge controller selects a first current as said current when a temperature detected by said temperature sensor is higher than a predetermined switch-temperature, and selects a second current greater than said first current, as said current when a temperature detected by said switch-temperature sensor is lower than said predetermined switch-temperature.

3. The mobile terminal as set forth in claim 2, wherein said first current and said second current are variable in dependence on operational condition of said mobile terminal.

4. The mobile terminal as set forth in claim 2, wherein a plurality of said switch-temperatures is determined in advance, and a plurality of currents is determined in advance in association with said switch-temperatures, wherein said charge controller selects one of said currents in dependence on whether a temperature detected by said temperature sensor is higher or lower than an associated switch-temperature.

5. The mobile terminal as set forth in claim 2, further comprising a display configured to display an indication indicating an amount of a charge current, said amount being either the first current or the second current.

6. The mobile terminal as set forth in claim 2, wherein said predetermined switch-temperature is determined based upon an ambient temperature in an area where the mobile terminal is located.

7. The mobile terminal as set forth in claim 2, wherein said predetermined switch-temperature is determined based upon a location of the mobile terminal.

8. The mobile terminal as set forth in claim 1, wherein said charge controller selects a first current as said current when a differential of a temperature detected by said temperature sensor is zero or positive, and selects a second current greater than said first current, as said current when a differential of a temperature detected by said temperature sensor is negative.

9. The mobile terminal as set forth in claim 1, wherein said charge controller stops said battery from being charged when a temperature detected by said temperature sensor is higher than a predetermined stop-temperature, and allows said battery to be charged when a temperature detected by said temperature sensor is lower than said predetermined stop-temperature.

10. The mobile terminal as set forth in claim 9, wherein said predetermined stop-temperature is determined based upon an ambient temperature in an area where the mobile terminal is located.

11. The mobile terminal as set forth in claim 9, wherein said predetermined stop-temperature is determined based upon a location of the mobile terminal.

12. The mobile terminal as set forth in claim 1, wherein said mobile terminal is comprised of a mobile phone.

13. The mobile terminal as set forth in claim 1, wherein the temperature sensor is located between the battery-charging circuit and a signal receiver.

14. A method of charging a battery mounted in a mobile terminal comprising a case, a battery mounted in said case, electronic parts mounted on a circuit board and arranged in said case and operated with electric power supplied from said battery, where said battery is not mounted on the circuit board and a battery-charging circuit supplying a current to said battery,
   said method including:
   a first step of detecting a temperature between an electronic part generating a largest amount of heat and another electronic part generating a second largest amount of heat among said electronic parts in said case, the detecting using a temperature sensor mounted on said circuit board; and
   a second step of controlling a current to be supplied to said battery from said battery- charging circuit, in accordance with a temperature detected in said first step.

15. The method as set forth in claim 14, wherein, in said second step, a first current is selected as said current when said temperature is higher than a predetermined switch- temperature, and a second current greater than said first current is selected as said current when said temperature is lower than said predetermined switch-temperature.

16. The method as set forth in claim 15, further including varying said first current and said second current in dependence on operational condition of said mobile terminal.

17. The method as set forth in claim 15, wherein a plurality of said switch-temperatures is determined in advance, and a plurality of currents is determined in advance in association with said switch-temperatures, wherein one of said currents is selected in dependence on whether the detected temperature is higher or lower than an associated switch-temperature in said second step.

18. The method as set forth in claim 14, wherein, in said second step, a first current is selected as said current when a differential of said temperature is zero or positive, and a second current greater than said first current is selected as said current when a differential of said temperature is negative.

19. The method as set forth in claim 14, wherein, in said second step, said battery is stopped from being charged when said temperature is higher than a predetermined stop-temperature, and said battery is allowed to be charged when said temperature is lower than said predetermined stop-temperature.

20. The method as set forth in claim 14, further comprising indicating an amount of a charge current, said amount being either the first current or the second current.

21. In a method of charging a battery mounted in a mobile terminal comprising a case, a battery mounted in said case, electronic parts mounted on a circuit board and arranged in said case and operated with electric power supplied from said battery, where said battery is not mounted on the circuit board, a battery-charging circuit supplying a current to said battery, and a charge controller allowing said battery-charging circuit to charge said battery or stopping said battery-charging circuit from charging said battery, a program for causing said charge controller to carry out said method of charging a battery mounted in a mobile terminal, steps executed by said charge controller in accordance with said program including:
a first step of controlling a current to be supplied to said battery from said battery-charging circuit, in accordance with a temperature detected between an electronic part generating a largest amount of heat and another electronic part generating a second largest amount of heat among said electronic parts in said case, the detecting using a temperature sensor mounted on said circuit board.

22. The program as set forth in claim 21, wherein, in said first step, a first current is selected as said current when said temperature is higher than a predetermined switch-temperature, and a second current greater than said first current is selected as said current when said temperature is lower than said predetermined switch-temperature.

23. The program as set forth in claim 22, wherein said steps further include a second step of varying said first current and said second current in dependence on operational condition of said mobile terminal.

24. The program as set forth in claim 22, wherein a plurality of said switch-temperatures is determined in advance, and a plurality of currents is determined in advance in association with said switch-temperatures, wherein one of said currents is selected in dependence on whether the detected temperature is higher or lower than an associated switch-temperature in said first step.

25. The program as set forth in claim 21, wherein, in said first step, a first current is selected as said current when a differential of said temperature is zero or positive, and a second current greater than said first current is selected as said current when a differential of said temperature is negative.

26. The program as set forth in claim 21, wherein, in said first step, said battery is stopped from being charged when said temperature is higher than a predetermined stop-temperature, and said battery is allowed to be charged when said temperature is lower than said predetermined stop-temperature.

27. A mobile terminal comprising:
battery means mounted in said case means;
case means for arranging electronic parts therein, said electronic parts operating with electric power supplied from said battery means;
a circuit board having the electronic parts mounted thereon, said battery means not being mounted on the circuit board;
battery-charging means for supplying a current to said battery means;
charge-control means for allowing said battery-charging means to charge said battery means or stopping said battery-charging means from charging said battery means; and
temperature sensing means for detecting a temperature in said case means, the temperature sensing means disposed between an electronic part generating a largest amount of heat and another electronic part generating a second largest amount of heat among said electronic parts said temperature sensor means being mounted on the circuit board,
said charge-control means controlling said current to be supplied to said battery means, in accordance with a temperature detected by said temperature sensing means.

* * * * *